United States Patent [19]
Roel-Ng et al.

[11] Patent Number: 6,151,498
[45] Date of Patent: Nov. 21, 2000

[54] SYSTEM AND METHOD FOR ROUTING POSITIONING REQUESTS BASED ON MOBILE SWITCHING CENTER ADDRESS

[75] Inventors: Maya Roel-Ng, Plano; Stephen Hayes, Carrollton; Theodore Havinis, Plano, all of Tex.

[73] Assignee: Ericsson Inc., Research Triangle Park, N.C.

[21] Appl. No.: 09/036,763

[22] Filed: Mar. 9, 1998

[51] Int. Cl.[7] .................................................... H04Q 7/20
[52] U.S. Cl. ........................................ 455/433; 455/455
[58] Field of Search .................................. 455/432, 528, 455/33.1, 433, 435, 458, 445, 456, 455

[56] References Cited

U.S. PATENT DOCUMENTS

| | | | |
|---|---|---|---|
| 5,621,783 | 4/1997 | Lantto et al. .......................... | 455/33.1 |
| 5,884,180 | 3/1999 | Betacchi ................................. | 455/445 |
| 5,991,620 | 11/1999 | Kingdon et al. ........................ | 455/432 |

*Primary Examiner*—William Cumming
*Attorney, Agent, or Firm*—Jenkins & Gilchrist, P.C.

[57] ABSTRACT

A telecommunications system and method is disclosed for allowing a Gateway Mobile Positioning Center (GMPC) to route positioning requests to the Public Land Mobile Network (PLMN) where the subscriber is currently located without the need for storing the subscriber's serving Mobile Positioning Center (MPC) address in the Home Location Register (HLR). When an external Requesting Application (RA) wants to locate a particular Mobile Station (MS), the RA contacts the GMPC, and provides the directory number of the subscriber that needs to be located. The GMPC then sends a request for routing information, e.g., the address of the serving Mobile Switching Center (MSC), to the subscriber's HLR. The HLR then returns the routing information to the GMPC, which can then send the positioning request to the serving MSC, using the MSC address. The serving MSC can then route the positioning request to the serving Mobile Positioning Center.

22 Claims, 5 Drawing Sheets

SYSTEM AND METHOD FOR ROUTING POSITIONING REQUESTS BASED ON MOBILE SWITCHING CENTER ADDRESS

BACKGROUND OF THE PRESENT INVENTION

1. Field of the Invention

The present invention relates generally to telecommunications systems and methods for determining the location of a mobile terminal within a cellular network, and specifically to routing positioning requests to a Mobile Positioning Center utilizing the address for a serving Mobile Switching Center.

BACKGROUND AND OBJECTS OF THE PRESENT INVENTION

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS 20 within a cellular network 10 has recently become important for a wide range of applications. For example, positioning services may be used by transport and taxi companies to determine the location of their vehicles. In addition, for emergency calls, e.g., 911 calls, the exact location of the mobile terminal 20 may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital.

As can be seen in FIG. 2 of the drawings, upon a network positioning request, the Base Station System (BSS) (220 and 240) serving the MS 200 generates positioning data, which is delivered to the Mobile Switching Center (MSC) 260. This positioning data is then forwarded to a Mobile Positioning Center (MPC) 270 for calculation of the geographical location of the MS 200. The location of the MS 200 can then be sent to the application 280 that requested the positioning. Alternatively, the requesting application 280 could be located within the MS 200 itself or within the network (MSC/VLR 260).

In order to accurately determine the location of the MS 200, positioning data from three or more separate Base Transceiver Stations (210, 220, and 230) is required. This positioning data for GSM systems can include, for example, a Timing Advance (TA) value, which corresponds to the amount of time in advance that the MS 200 must send a message in order for the BTS 220 to receive it in the time slot allocated to that MS 200. When a message is sent from the MS 200 to the BTS 220, there is a propagation delay, which depends on the distance between the MS 200 and the BTS 220. TA values are expressed in bit periods, and can range from 0 to 63, with each bit period corresponding to approximately 550 meters between the MS 200 and the BTS 220. It should be understood, however, that any estimate of time, distance, or angle for any cellular system can be used, instead of the TA value discussed herein.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSs, for example, BTSs 210 and 220, provide two possible points that the MS 200 could be located (where the two radiuses intersect). However, with three TA values from three BTSs, e.g., BTSs 210, 220, and 230, the location of the MS 200 can be determined with a certain degree of accuracy. Using a triangulation algorithm, with knowledge of the three TA values and site location data associated with each BTS (210, 220, and 230), the position of the mobile station 200 can be determined (with certain accuracy) by the Mobile Positioning Center 270.

Therefore, Timing Advance (TA) values are obtained from the original (serving) BTS 220 and two neighboring (target) BTSs (210 and 230). In order for each target BTS (210 and 230) to determine a TA value, a positioning handover to each of the BTSs (210 and 230) must occur. A positioning handover is similar to an ordinary asynchronous handover. The target BTS, e.g., BTS 210, distinguishes the Positioning Handover from an ordinary handover by a new ACTIVATION TYPE in the CHANNEL ACTIVATION message. Unlike an ordinary handover, upon reception of a HANDOVER ACCESS message from the MS 200, the target BTS 210 only calculates the TA value, and does not respond to the mobile station 200, that is, no PHYSICAL INFORMATION is sent to the MS 200. Thus, the MS 200 will then return to the previous channel allocated by the original BTS 220 after the time period defined by the MS's 200 internal counter expires, e.g., 320 milliseconds.

Each GSM PLMN 205 includes at least one Mobile Positioning Center (MPC) 270, which is able to position both the subscribers registered in the HLR (not shown) served by that MPC 270 and the subscribers roaming in the PLMN 205 served by that MPC 270. In order to support GSM location services while the subscriber is in the home or a serving PLMN 205, the positioning requests must be routed to the MPC 270 serving the area that the MS 200 is currently in. One solution, described in co-pending patent application, Ser. No. 08/978,956, routes positioning requests based upon the home and serving MPC 270 addresses. However, this solution requires storage of the home and serving MPC 270 addresses within the HLR, which is cumbersome for the network operator and the HLR.

It is, therefore, an object of the present invention to route positioning requests to the appropriate Mobile Positioning Center without the need for storage of MPC addresses within the subscriber's home HLR.

SUMMARY OF THE INVENTION

The present invention is directed to telecommunications systems and methods for allowing a Gateway Mobile Positioning Center (GMPC) to route positioning requests to the PLMN where the subscriber is currently located (serving PLMN) without the need for storage of the subscriber's serving MPC address in the HLR. When an external Requesting Application (RA) wants to locate a particular Mobile Station (MS), the RA contacts the GMPC, which can be located in a PLMN that is not necessarily the subscriber's home or visited PLMN. The RA then provides the directory number of the subscriber that needs to be located, e.g., for GSM, the MS International Subscriber Directory Number (MSISDN). The GMPC can then send a request for routing information, e.g., the address of the serving Mobile Switching Center, and positioning subscription information to the subscriber's Home Location Register (HLR). The signaling network, e.g., the Signaling System #7 (SS7) network, translates the MSISDN into the address of the subscriber's HLR and routes the request to the appropriate HLR, using this address. The subscriber's HLR then returns the routing information to the GMPC, which can then send the positioning request to the serving MSC/VLR, using the MSC address. The serving MSC/VLR can then route the positioning request to the serving Mobile Positioning Center. Alternatively, the GMPC can derive, from the MSC address, the address of the MPC (or other positioning node) within the serving PLMN using a look-up table. The positioning request can then be routed to this node in the serving PLMN.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
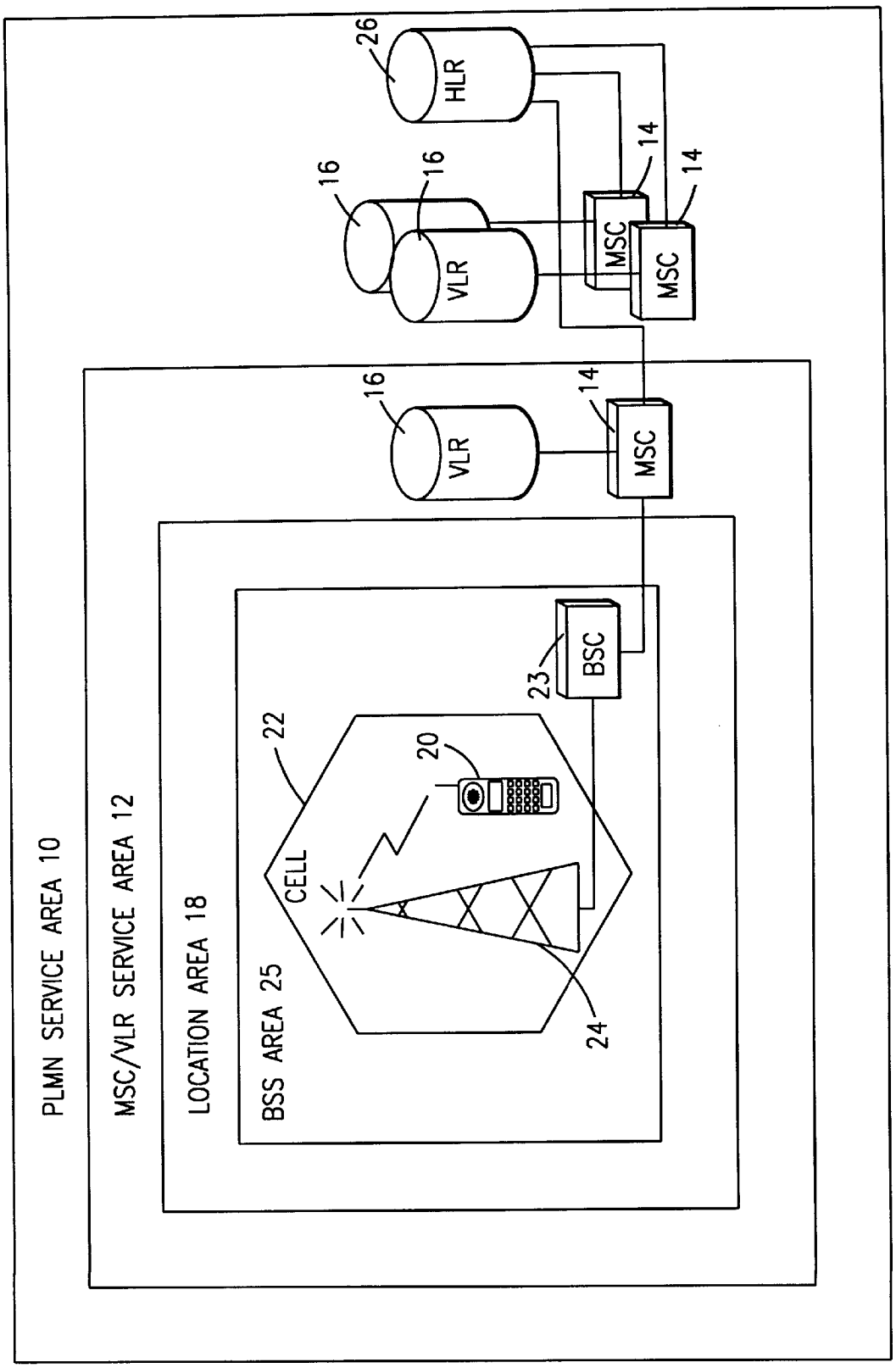
FIG. 1 is a block diagram of a conventional terrestrially-based wireless telecommunications system.
Figure 2:
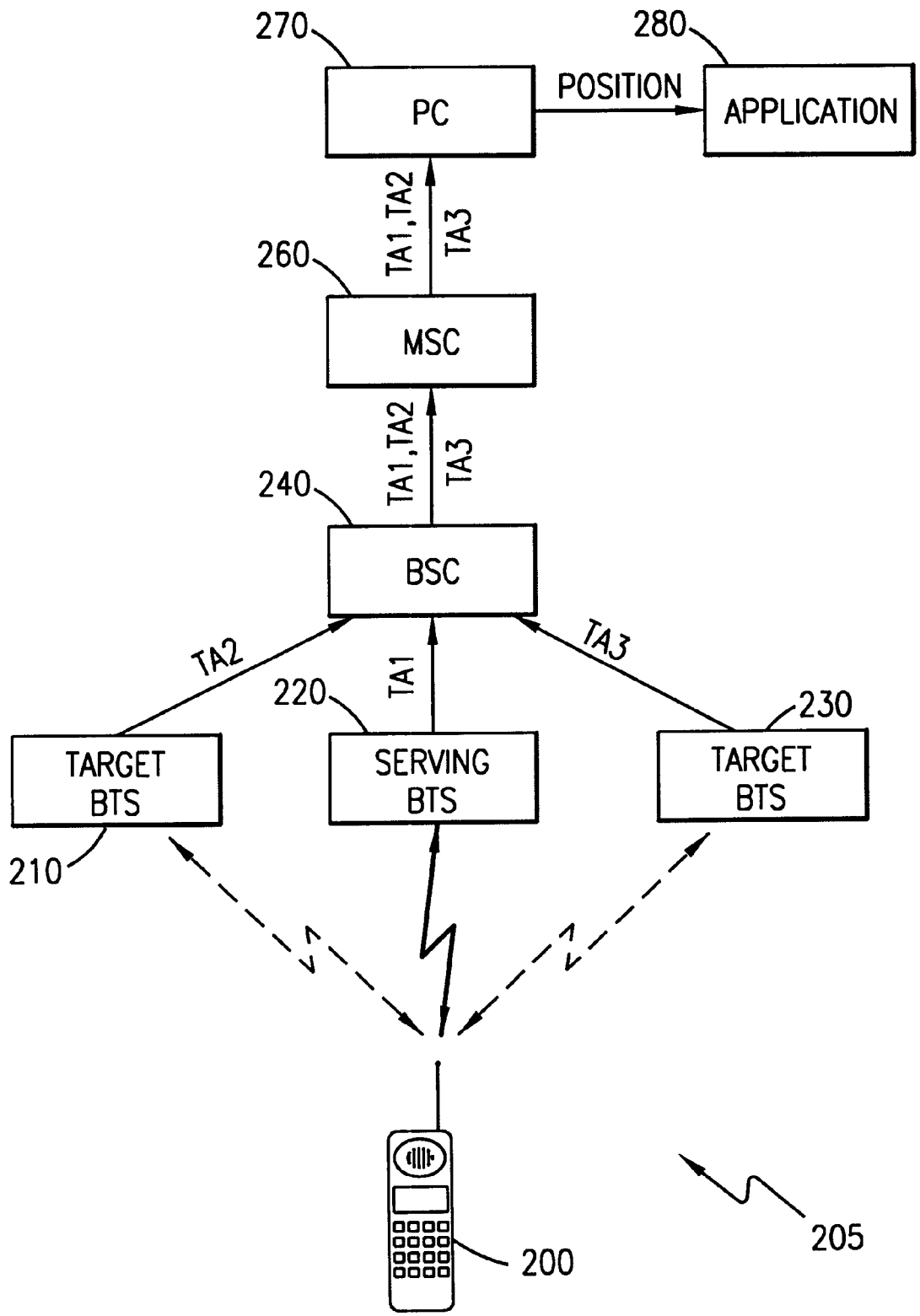
FIG. 2 illustrates a sample positioning handover in which positioning data is acquired by a target base transceiver station and transmitted to a serving base station controller.
Figure 3:
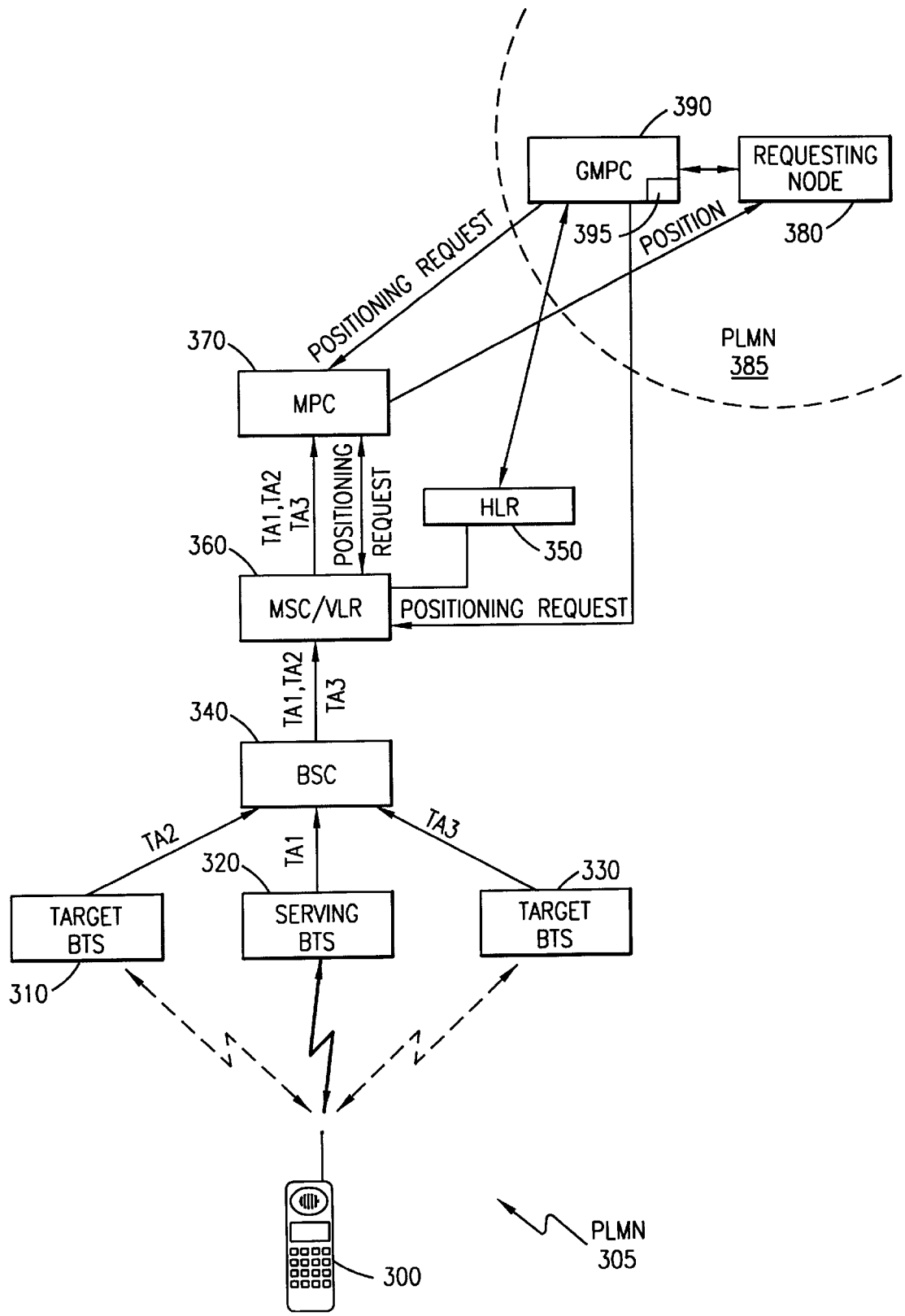
FIG. 3 illustrates the routing of a positioning request from a Requesting Application to a Mobile Positioning Center in accordance with preferred embodiments of the present invention.
Figure 4:
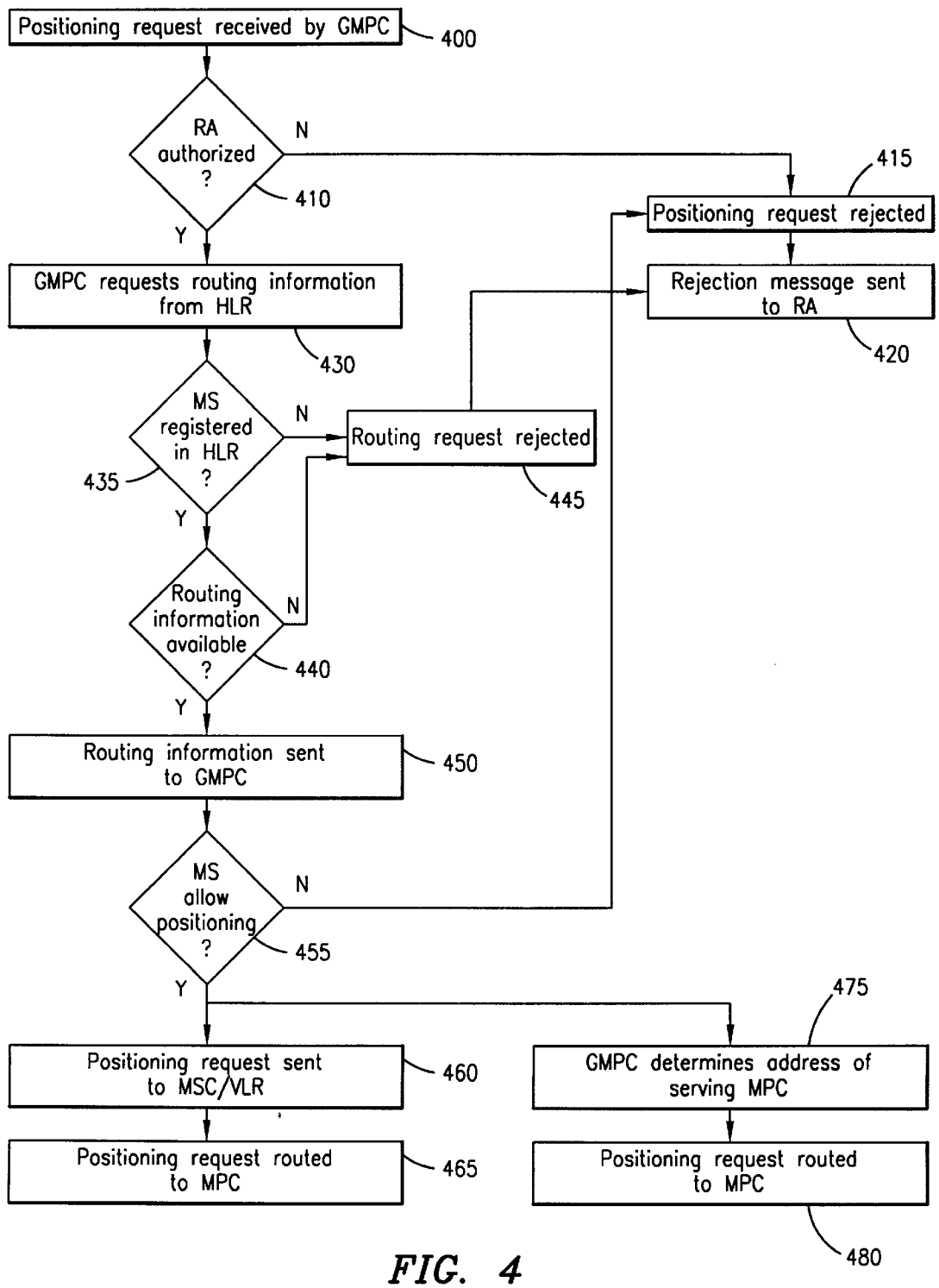
FIG. 4 demonstrates steps for routing of positioning requests in accordance with preferred embodiments of the present invention.

With reference now to FIG. 3 of the drawings, which will be described in connection with FIG. 4 of the drawings, when a Requesting Application (RA) 380 sends a positioning request for a particular Mobile Station (MS) 300 to a Gateway Mobile Positioning Center (GMPC) 390 (step 400), which is the GMPC 390 for the Public Land Mobile Network (PLMN) 385 that the RA 380 is in, the GMPC 390 must determine where to route the positioning request (step 450) in order to determine the location of the MS (step 595) of FIG. 5. (The GMPC 390 can be located in a PLMN 385 that is not necessarily the MS's 300 home or visited PLMN 305.) Therefore, the RA 380 also provides the GMPC 390 with the directory number of the MS 300 to be positioned (step 405), e.g., for GSM, this is the MS International Subscriber Directory Number (MSISDN).

Thereafter, the GMPC 390 verifies that the RA 380 is authorized to request the location service (step 410). If the RA 380 is not authorized (step 410), the positioning request is rejected by the GMPC 390 (step 415) and a rejection message is sent to the RA 380 (step 420). However, if the RA 380 is authorized to request positioning (step 410), the GMPC 390 then sends a request for routing information, e.g., the address of a Mobile Switching Center/Visitor Location Register (MSC/VLR) 360 serving the PLMN 305 that the MS 300 is currently located in and positioning subscription information for the MS 300 (step 430), to the MS's 300 home Home Location Register (HLR) 350, using the MS's 300 directory number as a global title. The signaling network, e.g., the Signaling System #7 (SS7) network (not shown), can perform a global title translation on the MSISDN and route the request to the appropriate HLR 350 for the MS 300.

The HLR 350 then checks its records to confirm that the MS 300 is registered in the HLR 350 (step 435), and that routing information for that MS 300 is available (step 440).

If the MS 300 is not registered in the HLR 350 (step 435) or the routing information is not available (step 440), the routing information request is rejected by the HLR 350 (step 445) and the GMPC 390 sends a rejection message to the RA 380 (step 420). However, if the MS 300 is registered in the HLR 350 (step 435) and routing information is available (step 440), the routing information, e.g., the serving MSC/VLR 360 address, together with the positioning subscription information, is sent to the GMPC 390 (step 450).

The GMPC 390 then verifies that the MS 300 to be positioned by the RA 380 allows positioning to be performed, by checking the positioning subscription information sent by the HLR 350 (step 455). If the MS 300 does not allow positioning (step 455), the positioning request is rejected (step 415) and a rejection message is sent to the RA 380 (step 420). However, if the MS 300 does allow positioning (step 455), the GMPC 390 can then send the positioning request to the serving MSC/VLR 360 (step 460), using the MSC/VLR 360 address. Thereafter, the serving MSC/VLR 360 will route the positioning request to the Mobile Positioning Center (MPC) 370 serving the PLMN 305 that the MS 300 is located in (step 465). It should be understood that the MPC 370 can be co-located with the serving MSC/VLR 360 or can be a separate node.

Alternatively, after the GMPC 390 confirms that the MS 300 allows positioning to be performed (step 455), the GMPC 390 can derive, from the MSC/VLR 360 address, the address of the MPC 370 in the serving PLMN 305, using, for example, a look-up table (database) 395 (step 475). Thereafter, the positioning request can be routed directly to the MPC 370 in the serving PLMN 305 (step 480).

Figure 5:
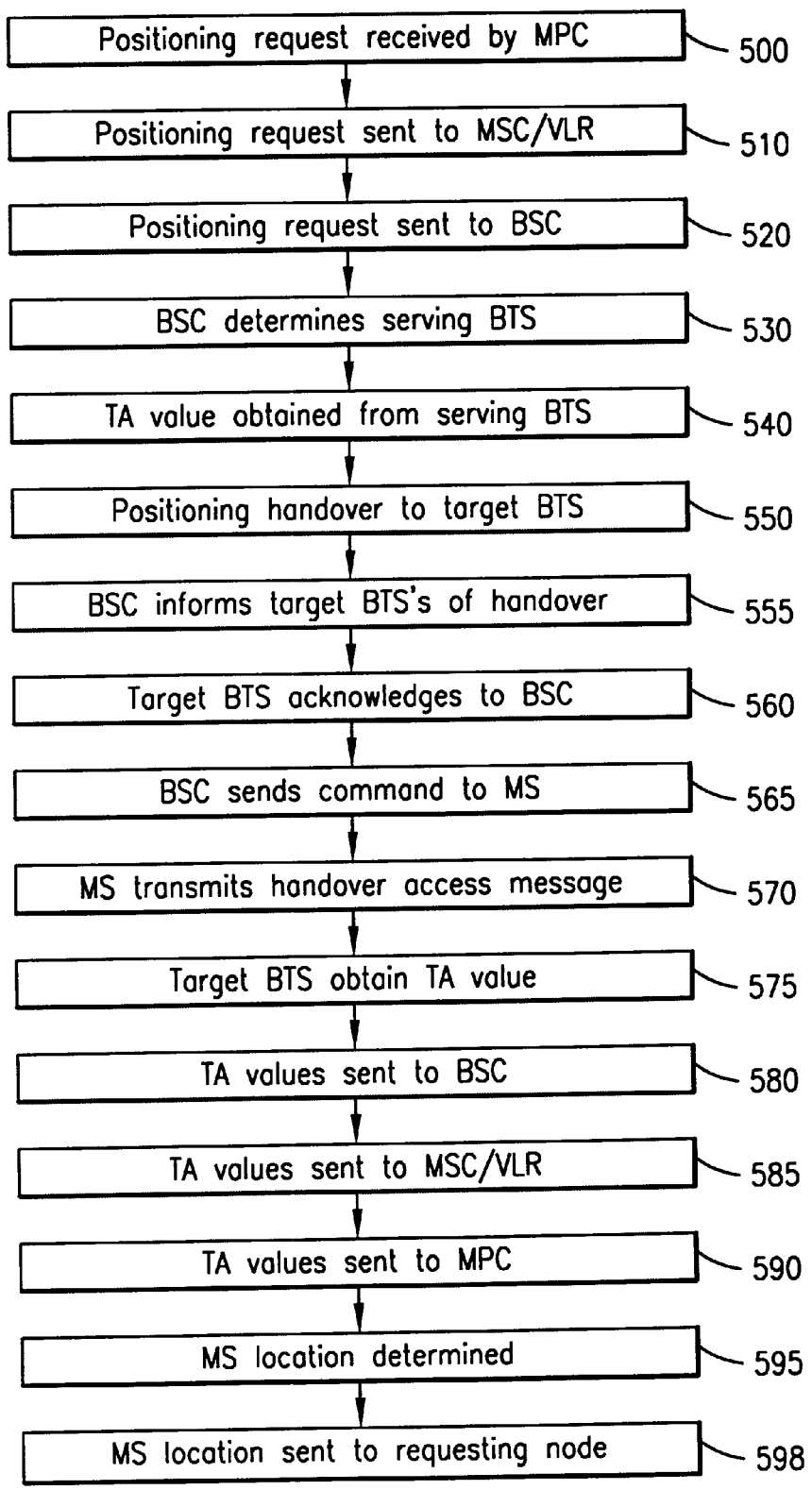
FIG. 5 demonstrates steps in a sample positioning of a specific mobile terminal.

With reference now to FIG. 5 of the drawings, once the positioning request is received by the serving MPC 370 (step 500), the MPC 370 sends the positioning request to the serving MSC/VLR 360 (step 510), which can then forward the positioning request to a Base Station Controller (BSC) 340 (step 520). If the MS 300 is in idle mode, the serving MSC/VLR 360 must page the MS 300 and setup a call to the MS 300 prior to forwarding the positioning request to the BSC 340 (step 520). This call does not activate the ringing tone on the MS 300, and therefore, is not noticed by the MS 300.

The originating BSC 340 then determines which Base Transceiver Station (BTS) 320 is currently serving the MS 300 (step 530), and obtains a Timing Advance (TA) value (TA1), or other positioning data, from this serving BTS 320 (step 540), if possible. Thereafter, TA values are obtained from two target BTSs (310 and 330) (step 580) by performing a positioning handover (step 550). If the serving BTS 320 does not support positioning, an additional target BTS (not shown) must be selected. It should be noted that other positioning methods based on triangulation can be used instead of obtaining TA values, as discussed herein. In addition, positioning of the MS 300 can be performed using more than three BTSs (310, 320, and 330).

The positioning handover to one of the target BTSs 330 (step 550) is accomplished by the serving BSC 340 sending a new ACTIVATION TYPE in a CHANNEL ACTIVATION message to the target BTS 330, which informs the target BTS 330 that a positioning handover needs to be performed (step 555). The target BTS 330 then acknowledges the CHANNEL ACTIVATION message to the serving BSC 340 (step 560).

Thereafter, the BSC 340 sends a command to the MS 300 via the serving BTS 320 (step 565) to transmit a HANDOVER ACCESS message to the target BTS 330 (step 570).

During the time that the MS 300 is waiting for a response from the target BTS 330, e.g., around 320 milliseconds, the target BTS 330 measures the Timing Advance value (access delay) (TA3) (step 575), using access bursts sent by the MS 300, and forwards this positioning data to the serving BSC 340 (step 580). A positioning handover can then be performed to the other target BTS 310 in the same manner as stated hereinbefore. The TA value measured by the target BTS 330 (TA3) is then transmitted by the serving BSC 340 to the MSC 360, together with TA values (TA1 and TA2) obtained from the serving BTS 320 and other target BTSs 310 (step 585).

Finally, the TA value acquired from the target BTS 330 (TA3), together with other TA values (TA1 and TA2) are forwarded to the serving Mobile Positioning Center (MPC) 370 from the MSC/VLR 360 (step 590), where the location of the MS 300 is determined using the triangulation algorithm (step 595). The MPC 370 then presents the geographical position of the MS 300 to the requesting application (node) 380 (step 598).

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the location services can be used by applications located-in or connected-to the subscriber's MS, by network applications or by external applications.

In addition, it should be understood that other positioning methods, instead of the Timing Advance positioning method discussed herein, can be used to determine the location of the mobile terminal. For example, such positioning methods can include: Time of Arrival, Angle of Arrival, Global Positioning System, Observed Time Difference, or Enhanced Observed Time Difference.

Furthermore, it should be understood that the positioning systems and methods disclosed herein can be utilized by any cellular network, including, but not limited to the Global System for Mobile Communications (GSM) network, the Personal Communications Systems (PCS) network, the AMPS network and the D-AMPS network.

What is claimed is:

1. A telecommunications system for routing a positioning request to determine the location of a given one of a plurality of mobile terminals in wireless communications with a mobile switching center, said telecommunications system comprising:

a gateway mobile positioning center for receiving said positioning request and an identification number associated with said given mobile terminal from a requesting node in communication with said gateway mobile positioning center, said gateway mobile positioning center verifying the authorization of said requesting node to send said positioning request, said gateway mobile positioning center sending a rejection message to said requesting node when said requesting node does not have authorization to send said positioning request, the location of said given mobile terminal not being determined when said rejection message is sent;

a home location register connected to said mobile switching center, said home location register being identified using said identification number, said gateway mobile positioning center sending a routing request to said home location register, said home location register sending routing information associated with said mobile switching center to said gateway mobile positioning center; and a positioning node in communication with said mobile switching center, said gateway mobile positioning center forwarding said positioning request to said positioning node, using said routing information, said positioning node determining the location of said given mobile terminal.

2. The telecommunications system of claim 1, wherein said gateway mobile positioning center and said requesting node are within a first public land mobile network.

3. The telecommunications system of claim 2, wherein said given mobile terminal, said mobile switching center, and said positioning node are within a second public land mobile network.

4. The telecommunications system of claim 1, wherein said positioning node is a Mobile Positioning Center.

5. The telecommunications system of claim 1, wherein said identification number is a Mobile Station International Subscriber Directory Number.

6. The telecommunications system of claim 1, wherein said routing information is the address of said mobile switching center.

7. The telecommunications system of claim 1, wherein said home location register sends subscription information to said gateway mobile positioning center, said gateway mobile positioning center determining whether said given mobile terminal allows positioning to be performed, using said subscription information, said gateway mobile positioning center sending a rejection message to said requesting node when said given mobile terminal does not allow positioning, the location of said given mobile terminal not being determined when said rejection message is sent.

8. The telecommunications system of claim 1, wherein said home location register confirms the registration of said given mobile terminal with said home location register, said gateway mobile positioning center sending to said requesting node a rejection message when said given mobile terminal is not registered in said home location register, the location of said given mobile terminal not being determined when said rejection message is sent.

9. The telecommunications system of claim 1, wherein said home location register verifies the availability of said routing information, said gateway mobile positioning center sending said requesting node a rejection message when said routing information is not available, the location of said given mobile terminal not being determined when said rejection message is sent.

10. The telecommunications system of claim 1, wherein said gateway mobile positioning center forwards said positioning request to said positioning node via said mobile switching center.

11. The telecommunications system of claim 1, wherein said gateway mobile positioning center has a database therein, said database containing an address associated with said positioning node, said routing information being associated with said address, said gateway mobile positioning center determining said address using said routing information, said positioning request being sent to said positioning node using said address.

12. A method for routing a positioning request to determine the location of a given one of a plurality of mobile terminals in wireless communications with a mobile switching center, said method comprising the steps of:

receiving, by a gateway mobile positioning center, said positioning request and an identification number associated with said given mobile terminal from a requesting node;

verifying, by said gateway mobile positioning center, the authorization of said requesting node to send said positioning request;

sending, by said gateway mobile positioning center, a rejection message to said requesting node when said requesting node does not have authorization to send said positioning request;

sending, by said gateway mobile positioning center, a routing request to a home location register connected to said mobile switching center when said requesting node does have authority to send said positioning request, said home location register being identified using said identification number;

sending, by said home location register, routing information associated with said mobile switching center to said gateway mobile positioning center;

forwarding, by said gateway mobile positioning center, said positioning request to a positioning node in communication with said mobile switching center, using said routing information; and determining, by said positioning node, the location of said given mobile terminal.

13. The method of claim 12, wherein said gateway mobile positioning center and said requesting node are within a first public land mobile network.

14. The method of claim 13, wherein said given mobile terminal, said mobile switching center, and said positioning node are within a second public land mobile network.

15. The method of claim 12, wherein said positioning node is a Mobile Positioning Center.

16. The method of claim 12, wherein said identification number is a Mobile Station International Subscriber Directory Number.

17. The method of claim 12, wherein said routing information is the address of said mobile switching center.

18. The method of claim 12, further comprising, before said step of forwarding, the steps of:

sending, by said home location register, subscription information to said gateway mobile positioning center;

determining, by said gateway mobile positioning center, whether said given mobile terminal allows positioning to be performed, using said subscription information; and sending, by said gateway mobile positioning center, a rejection message to said requesting node when said given mobile terminal does not allow positioning, said step of determining the location of said given mobile terminal not being performed when said rejection message is sent.

19. The method of claim 12, further comprising, before said step of sending said routing information, the steps of:

confirming, by said home location register, the registration of said given mobile terminal with said home location register; and sending, by said gateway mobile positioning center, a rejection message to said requesting node when said given mobile terminal is not registered in said home location register, said step of determining the location of said given mobile terminal not being performed when said rejection message is sent.

20. The method of claim 12, further comprising, before said step of sending said routing information, the steps of:

verifying, by said home location register, the availability of said routing information; and sending, by said gateway mobile positioning center, a rejection message to said requesting node when said routing information is not available, said step of determining the location of said given mobile terminal not being performed when said rejection message is sent.

21. The method of claim 12, wherein said step of forwarding is performed by said gateway mobile positioning center forwarding said positioning request to said positioning node via said mobile switching center.

22. The method of claim 12, wherein said gateway mobile positioning center has a database therein, said database containing an address associated with said positioning node, said routing information being associated with said address, said gateway mobile positioning center determining said address using said routing information, said step of forwarding being performed by said gateway mobile positioning center sending said positioning request to said positioning node, using said address.

* * * * *

UNITED STATES PATENT AND TRADEMARK OFFICE
CERTIFICATE OF CORRECTION

PATENT NO.   : 6,151,498
DATED        : November 21, 2000
INVENTOR(S)  : Roel-Ng, et al.

Page 1 of 1

It is certified that error appears in the above-identified patent and that said Letters Patent is hereby corrected as shown below:

Title page,
Item [56], should read:
[56] References Cited: Foreign Patent Documents:
    WO 98/00988 ...... 1/8/98
    WO 98/51104 ...... 11/12/98
    PCT International Search Report dated 6/11/99

Attorney, Agent or Firm: replace "Jenkins" with -- Jenkens --

Column 7,
Line 36, replace "sending to said" with -- sending said --

Signed and Sealed this

Eleventh Day of September, 2001

*Attest:*

NICHOLAS P. GODICI
*Attesting Officer*     Acting Director of the United States Patent and Trademark Office